(No Model.)

C. C. TILGHMAN & J. N. GOLDSBOROUGH.
THILL COUPLING CLIP.

No. 455,843. Patented July 14, 1891.

Attest:
H. H. Schott
Percy B. Hille

Inventors
Charles C. Tilghman
and
Joseph N. Goldsborough
By their attorneys
Pennie & Goldsborough

UNITED STATES PATENT OFFICE.

CHARLES CARROLL TILGHMAN AND JOSEPH NICHOLSON GOLDSBOROUGH, OF CARMICHAEL, MARYLAND.

THILL-COUPLING CLIP.

SPECIFICATION forming part of Letters Patent No. 455,843, dated July 14, 1891.

Application filed April 11, 1891. Serial No. 388,455. (No model.)

*To all whom it may concern:*

Be it known that we, CHARLES CARROLL TILGHMAN and JOSEPH NICHOLSON GOLDSBOROUGH, citizens of the United States, residing at Carmichael, in the county of Queen Anne and State of Maryland, have invented certain new and useful Improvements in Axle-Clips; we do hereby declare the following to be a full, clear, and exact description of the invention, such as will enable others skilled in the art to which it appertains to make and use the same.

Our present invention relates to axle-clips for carriages, wagons, and other vehicles, and has for its object to provide a clip which may be readily adjusted on the axle without the use of special tools, so as to permit the attachment thereto of shafts of different widths or sizes, or those which have become warped or sprung, also which will allow of the shifting of the shafts along the axle toward one side or the other of the vehicle.

With these objects in view our invention consists in the construction, arrangement, and combination of parts, hereinafter described and illustrated, and more particularly pointed out in the appended claims.

Figure 1:
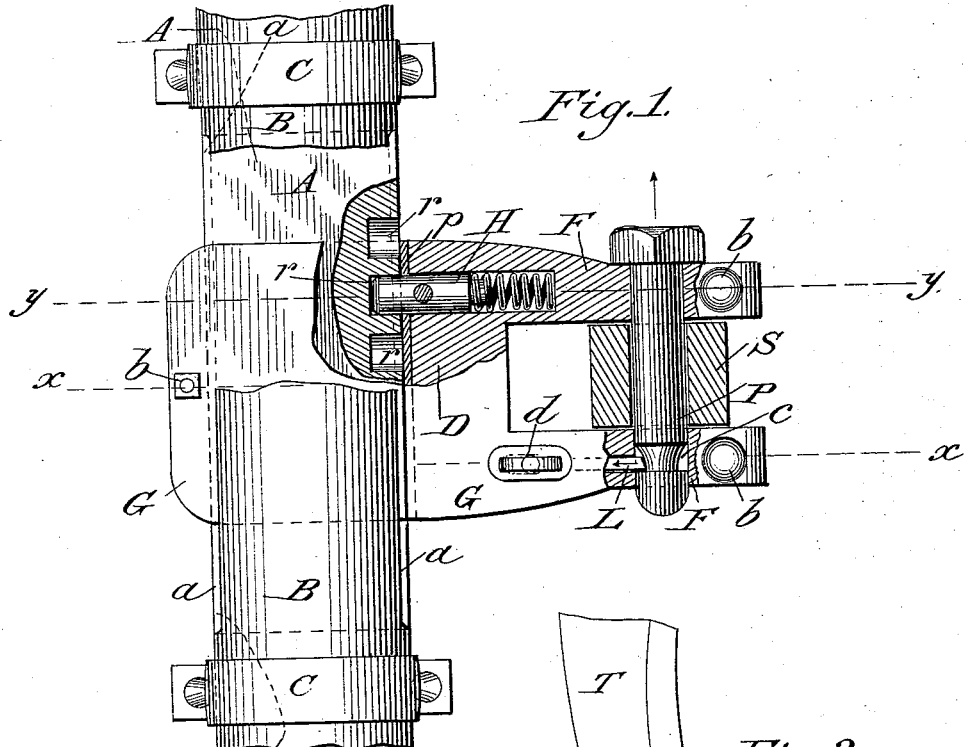
Figure 2:
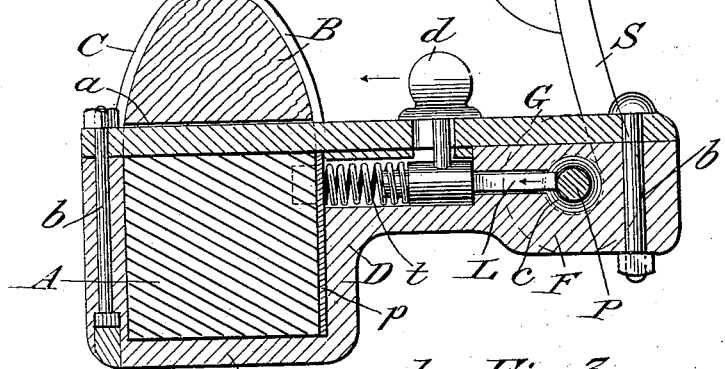
Figure 3:
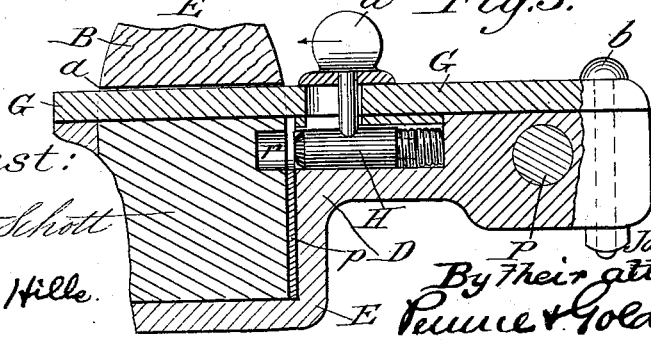

In the accompanying drawings, forming part of this specification, Figure 1 is a plan view of a vehicle-axle with our improved clip in position, parts of the axle and clip being broken away, so as to expose certain details of construction. Fig. 2 is a vertical cross-section on the line $x\ x$ of Fig. 1, and Fig. 3 a similar section on the line $y\ y$ of the same figure.

In the several views similar parts are denoted by the same letters of reference.

A indicates the axle of a carriage, wagon, sleigh, or other vehicle.

B is an overlying strip secured thereto by clamps, straps, or other suitable means C, sufficient space $a$ being left between the top of the axle and a portion of the length of the strip to accommodate the top or cap-plate of the clip and allow it to slide along the axle, the strip acting as a guide for the clip and serving also to strengthen and stiffen the axle at this point.

The clip proper is constructed preferably as follows:

D is the body part, formed at its rear into the U-shaped piece E, of such size and shape as to snugly embrace three sides of the axle, as shown. Projecting forward from the body of the clip are two parallel horizontal arms F, by means of which the thills are attached to the clip, any preferred form of coupler or anti-rattler being used for this purpose.

G is the top plate of the clip, for convenience made in the form of a detachable cap, screwed, bolted, or otherwise fastened down upon the upper side of the body part, thus entirely surrounding the axle. Bolts and nuts $b$ are shown in the drawings for this purpose, one at the extremity of each arm F and one at the rear of the axle, the hole for the head of the latter being counter bored and plugged, as shown, for neatness of finish.

P denotes the usual removable coupling-pin to receive the thill-shackle S of the shaft or thill T. This pin is held in place in its bearings in the arms by the spring-latch L catching behind a shoulder $c$ near the entering end of the pin. This latch is housed in a recess formed in the body of the clip, as shown, and is urged forward by a spring $t$, seated in the recess behind the enlarged butt-end of the latch, a pin from which projects up through the top plate of the clip, where it is provided with a thumb-button $d$ for withdrawing the latch, the shank of the button being flattened out to cover the slot and act as a dust-guard as the latch moves to and fro.

To set the clip in different positions along the axle and securely lock and hold it in place, we form small holes or recesses $r$ in the front side of the axle, the number of these recesses depending upon the degree of adjustment of the clip desired. Co-operating with these recesses is the spring-actuated bolt H, housed in a recess in the body of the clip, like the coupling-pin latch, and in all respects like the latch L, except that it is much stouter and acts in a reverse direction. A thin plate $p$ is secured on the inner side of the front vertical wall of the clip to close the rear end of latch-recess. It also serves as an anti-friction plate for the clip as it slides along the axle.

It is obvious that some of the details of the above construction may be varied without departing from the spirit or scope of our invention. For example, the spring latch and bolt may be constructed in any other form than that shown, the top plate of the clip may be integral with the body, and the shape of the clip may be varied as circumstances require.

Having thus described our invention, what we claim and desire to secure by Letters Patent, is—

1. An axle-clip for vehicles, consisting of a body part adapted to embrace and slide upon the axle, forwardly-extending arms for the attachment of the thills, a removable coupling-pin mounted in the arms, a spring-latch for holding the pin in place, and a spring-actuated bolt adapted to take into recesses in the axle, substantially as described.

2. An axle-clip for vehicles, consisting of the body part D, having the U-shaped piece to embrace the axle, the forwardly-extending parallel arms F, the top plate G, the removable coupling-pin P, having the shouldered entering end, the spring-latch L, seated in the clip and engaging the shoulder of the pin, and the spring-actuated bolt H, adapted to fit into recesses in the axle, the latch and bolt provided with thumb-buttons, substantially as described.

3. The combination, with the axle having recesses in its front side of the clip embracing the axle and adapted to slide thereupon, and a spring-actuated locking-bolt housed in the body of the clip and adapted to take into the recesses in the axle, substantially as described.

4. The combination, with the axle having recesses in its front side and an overlying guide-strip, of the clip embracing the axle, with its top plate sliding between the latter and the guide-strip, and a spring-actuated locking-bolt carried by the clip and adapted to take into the recesses in the axle, substantially as described.

5. The combination, with the axle having recesses in its front side and an overlying guide-strip, of the clip embracing the axle, with its top plate sliding between the latter and the guide-strip, forwardly-projecting parallel arms for the attachment of the thills, the removable shouldered coupling-pin, the spring-latch for holding the pin in place, and the spring-actuated bolt adapted to take into the recesses in the axle, the latch and bolt having pins projecting through slots in the top plate of the clip and provided with thumb-buttons, substantially as described.

In testimony whereof we affix our signatures in presence of two witnesses.

CHARLES CARROLL TILGHMAN.
JOSEPH NICHOLSON GOLDSBOROUGH.

Witnesses:
W. L. HOLTON,
C. M. CATLIN.